(12) United States Patent
Zhuang et al.

(10) Patent No.: US 11,251,984 B2
(45) Date of Patent: Feb. 15, 2022

(54) CABLE MODEM INTERFACE MASK BASED VIRTUAL LOCAL AREA NETWORK MAPPING

(71) Applicant: INTERDIGITAL CE PATENT HOLDINGS, Paris (FR)

(72) Inventors: Zujian Zhuang, Beijing (CN); Jinfei Yu, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 16/757,989

(22) PCT Filed: Oct. 24, 2017

(86) PCT No.: PCT/CN2017/107470
§ 371 (c)(1),
(2) Date: Apr. 21, 2020

(87) PCT Pub. No.: WO2019/079969
PCT Pub. Date: May 2, 2019

(65) Prior Publication Data
US 2020/0295961 A1 Sep. 17, 2020

(51) Int. Cl.
*H04L 12/28* (2006.01)
*H04N 21/61* (2011.01)
(Continued)

(52) U.S. Cl.
CPC ...... *H04L 12/2801* (2013.01); *H04L 12/4641* (2013.01); *H04L 12/66* (2013.01);
(Continued)

(58) Field of Classification Search
CPC . H04L 12/2801; H04L 47/2441; H04L 12/66; H04L 12/4641; H04L 41/0803;
(Continued)

(56) References Cited

U.S. PATENT DOCUMENTS 7,239,629 B1 * 7/2007 Olshansky ........... H04Q 3/0045
370/353
8,867,541 B2 10/2014 Duenyas
(Continued)

FOREIGN PATENT DOCUMENTS

CN 1482774 A 3/2004
CN 101199166 A 6/2008
(Continued)

OTHER PUBLICATIONS

Tang, "Method for classifying data stream by using the fouth level port number mask", Mar. 17, 2004, English Translation. (Year: 2004).*

(Continued)

*Primary Examiner* — Arvin Eskandarnia
*Assistant Examiner* — Chhian (Amy) Ling
(74) *Attorney, Agent, or Firm* — Jerome G. Schaefer

(57) ABSTRACT

A method to assign a service flow classification for a client device that is performed at a network interface device includes accessing a configuration file having an interface mask, and correlating interface mask bit values with at least one port of the network interface. The network interface device associates the client device with the at least one port of the network interface device and assigns a service flow classification based on the interface mask bit values for an access request received by the network interface device from the client device. The network interface device then communicates with a virtual local area network mapping device using the service flow classification. The virtual local area network mapping device maps the service flow into a VLAN for the service flow of the client device.

20 Claims, 10 Drawing Sheets

(51) Int. Cl.
  *H04L 12/24*     (2006.01)
  *H04L 12/46*     (2006.01)
  *H04L 12/66*     (2006.01)
  *H04L 12/851*    (2013.01)
  *H04L 12/931*    (2013.01)
  *H04L 12/54*     (2013.01)
  *H04L 47/2441*   (2022.01)
  *H04L 41/0803*   (2022.01)

(52) U.S. Cl.
  CPC ...... *H04L 41/0803* (2013.01); *H04L 47/2441* (2013.01); *H04N 21/6118* (2013.01); *H04N 21/6168* (2013.01)

(58) Field of Classification Search
  CPC .............. H04L 49/354; H04N 21/6168; H04N 21/6118
  See application file for complete search history.

(56) References Cited

U.S. PATENT DOCUMENTS

| | | | |
|---|---|---|---|
| 8,917,625 | B2 | 12/2014 | Li et al. |
| 9,025,533 | B1* | 5/2015 | Lok ............... H04L 41/0886 370/328 |
| 2002/0065907 | A1 | 5/2002 | Cloonan et al. |
| 2003/0106067 | A1 | 6/2003 | Hoskins et al. |
| 2005/0226257 | A1 | 10/2005 | Mirzabegian et al. |
| 2005/0265398 | A1 | 12/2005 | Chapman et al. |
| 2009/0049191 | A1 | 2/2009 | Tolliver |
| 2009/0129386 | A1 | 5/2009 | Rune |
| 2011/0110266 | A1 | 5/2011 | Li et al. |
| 2013/0070825 | A1 | 3/2013 | Chapman |
| 2014/0314089 | A1* | 10/2014 | Ke ................... H04L 69/08 370/392 |
| 2016/0105712 | A1* | 4/2016 | Venes ............... H04N 7/106 725/81 |
| 2016/0294685 | A1 | 10/2016 | Biswal et al. |
| 2017/0244577 | A1 | 8/2017 | Patrick et al. |
| 2018/0241716 | A1* | 8/2018 | Roberts ............... H04L 61/2092 |

FOREIGN PATENT DOCUMENTS

| | | |
|---|---|---|
| CN | 103780435 A | 5/2014 |
| CN | 104158920 A | 11/2014 |
| CN | 105634824 A | 6/2016 |
| CN | 105704056 A | 6/2016 |
| CN | 105721327 A | 6/2016 |
| CN | 06302043 A | 1/2017 |
| CN | 106302043 A | 1/2017 |
| CN | 103152256 B | 5/2017 |
| WO | WO2015077913 A1 | 6/2015 |
| WO | WO2017024571 A1 | 2/2017 |

OTHER PUBLICATIONS

Cable Docsis@Layer 2 Virtual Private Networking: Final_draft_ETSI_ES_203_385V111 dated Sep. 30, 2014.
CN105721327A TR EN Machine Aug. 10, 2021.
CN105634824A TR EN machine Aug. 10, 2021.
Yanrui Wang, "VLAN Technology Based Network Security Analysis", Aug. 15, 2008, Network Security Technology and Application, Issue 8 / Chinese version.
volpefirm.com/wp-content/uploads/2017/01/CM-SP-MULPLv3.0-127-1505281.pdf, Data Over Cable Service Interface Specification DOCSIS 3.0 MAC and Upper Layer Protocols Interface Specification—CM SP MULP v.3.0-127-150528, May 28, 2015 Cable Television Laboratories.
CN105704056A TR EN machine Aug. 10, 2021.
Yanrui Wang, "VLAN Technology Based Network Security Analysis", Aug. 15, 2008, Network Security Technology and Application, Issue 8/English translation (Chinese version submitted Aug. 23, 2021).

* cited by examiner

```
☐ UsPacketClass (22)[len=21]
    ☐ ClassifierRef (1)[len=1]         5
    ☐ ServiceFlowRef (3)[len=2]        2
    ☐ IpPacketClassifier (9)[len=12]
        ☐ IpSrcAddr (3)[len=4]         10.20.0.0
        ☐ IpSrcMask (4)[len=4]         255.255.0.0
☐ UsPacketClass (22)[len=21]
    ☐ ClassifierRef (1)[len=1]         6
    ☐ ServiceFlowRef (3)[len=2]        3
    ☐ IpPacketClassifier (9)[len=12]
        ☐ IpSrcAddr (3)[len=4]         172.20.0.0
        ☐ IpSrcMask (4)[len=4]         255.255.0.0
☐ DsPacketClass (23)[len=21]
    ☐ ClassifierRef (1)[len=1]         11
    ☐ ServiceFlowRef (3)[len=2]        13
    ☐ IpPacketClassifier (9)[len=12]
        ☐ IpSrcAddr (3)[len=4]         10.17.253.0
        ☐ IpSrcMask (4)[len=4]         255.255.255.0
☐ DsPacketClass (23)[len=21]
    ☐ ClassifierRef (1)[len=1]         12
    ☐ ServiceFlowRef (3)[len=2]        13
    ☐ IpPacketClassifier (9)[len=12]
        ☐ IpSrcAddr (3)[len=4]         10.17.252.0
        ☐ IpSrcMask (4)[len=4]         255.255.224.0
☐ DsPacketClass (23)[len=21]
    ☐ ClassifierRef (1)[len=1]         13
    ☐ ServiceFlowRef (3)[len=2]        12
    ☐ IpPacketClassifier (9)[len=12]
        ☐ IpDstAddr (5)[len=4]         10.20.0.0
        ☐ IpDstMask (6)[len=4]         255.255.0.0
```

Fig. 6

☐ UsPacketClass (22)[len=25]
    ☐ IpPacketClassifier (9)[len=16]
        ☐ DstPortStart (9)[len=2]        67
        ☐ DstPortEnd (10)[len=2]       67
        ☐ SrcPortStart (7)[len=2]        68
        ☐ SrcPortEnd (8)[len=2]        68
    ☐ VendorSpecific (43)[len=24]
        ☐ VendorIdentifier (8)[len=3]    0x001095
        ☐ GenericTLV TlvCode 115      TlvLength 1 TlvValue 0x3c
        ☐ GenericTLV TlvCode 116      TlvString "technicolor" /* tlv length = 11 */
        ☐ GenericTLV TlvCode 117      TlvLength 1 TlvValue 0x05

Fig. 9

- ☑ UsPacketClass (22)[len=13]
  - ☑ ClassifierRef (1)[len=1]         1
  - ☑ ServiceFlowRef (3)[len=2]        2
  - ☑ CMInterfaceMask (13)[len=4]      0x08000000
- ☑ UsPacketClass (22)[len=13]
  - ☑ ClassifierRef (1)[len=1]         2
  - ☑ ServiceFlowRef (3)[len=2]        3
  - ☑ CMInterfaceMask (13)[len=4]      0x00001000
- ☑ UsPacketClass (22)[len=13]
  - ☑ ClassifierRef (1)[len=1]         3
  - ☑ ServiceFlowRef (3)[len=2]        4
  - ☑ CMInterfaceMask (13)[len=4]      0x00000800

Fig. 10

CABLE MODEM INTERFACE MASK BASED VIRTUAL LOCAL AREA NETWORK MAPPING

This application claims the benefit, under 35 U.S.C. § 365 of International Application PCT/CN2017/107470, filed 24 Oct. 2017, which was published in accordance with PCT Article 21(2) on May 2, 2019 in English.

FIELD

The present principles relate to communications in a network setting, specifically, they relate to a method to facilitate mapping of service flows through a gateway or cable modem to allow virtual local area network mapping.

BACKGROUND

The use of the C-DOCSIS standard is initiated by China for use by cable multi system operators (MSOs) and other authorities to enhance the DOCSIS standards targeting the last mile cable access field. C-DOCSIS is based on DOCSIS and Euro DOCSIS standards and keeps the RF interface definition from DOCSIS and Euro DOCSIS intact with small modifications to accommodate some high order QAM modulation types. C-DOCSIS mostly focuses on defining how the head-end device called a cable media converter (CMC) performs at Layer 2 specifications. Compared to traditional cable modem termination system (CMTS) which is working on layer 3 routing mode, a CMC is simplified to be virtual local area network (VLAN) aware device to bridge packets between the service flows from a cable modem (CM) or gateway (GW) and the VLANs in an ethernet network.

Typically, the communication between a CMC and a cable modem or gateway are categorized into several service flows associated with each cable modem. For example, such service flows from a gateway or cable modem include a data service flow, a VoIP service flow, an IPTV service flow, and a primary service flow. In a cable modem, the packets can be classified by various classification rules and then go to the corresponding service flow, while the others that can't be classified go to a primary service flow. All service flows are forwarded towards a CMC over RF coaxial cable. The CMC forwards these packets to correct VLANs to maintain IP connectivity.

The main function of CMC is how to decide the correct VLAN for packets from cable modem. Due to the layer 2 mode of CMC and the isolation property between VLAN, the packets from cable modem must be mapped to correct VLAN, otherwise the packets will be lost somewhere in the network.

The current implementation of a CMC device mostly relies on the dynamic host configuration protocol (DHCP) relay in CMC to intercept the DHCP protocol communication between IP devices, such as client devices, behind cable modem and DHCP server in MSO central office. Usually DHCP clients will identify their device type by DHCP option 60, the DHCP relay function in CMC relays DHCP messages to DHCP server which will assign IP address within different IP subnet to different DHCP client according to option 60 and provisioned policy. After IP address assignment, a CMC can map different IP subnet to different VLANs according to a local configuration. Another way to decide VLAN membership in a CMC is to directly map DHCP messages to a VLAN by the different DHCP option 60 according to a local configuration.

This common implementation also applies to traditional CMTS which performs Layer 2 forwarding partially. However, the current implementation doesn't accommodate a CMTS/CMC layer 2 mode very well. The first drawback is the DHCP messages and ARP messages can't be classified according to DOCSIS and Euro DOCSIS standards, so all such packets will fall into a primary service flow which means there's no quality of service (QoS) guarantee for those packets.

The second drawback is DHCP option 60 based VLAN mapping cannot differentiate DHCP clients having a same option 60 from different cable modems or gateways. In some cases, an operator may require different VLANs for devices behind different cable modems or gateways even they carry the same DHCP option 60 value.

The third drawback is after DHCP clients get an IP address and the cable modem or gateway can classify the packets according to IP subnet classification rules, it is still a significant operation and maintenance load for an operator to organize the correct cable modem configuration file for each cable modem. This is true because the IP subnet may be different for different groups of CMCs serving regions which means that the cable modem configuration file cannot be shared by large number of cable modems or gateways.

The fourth drawback is what happens if a device behind a cable modem uses point to point protocol over ethernet (PPPoE) instead of DHCP to acquire an IP configuration? The DHCP relay in a CMC cannot deal with such a situation and then it can only use the default VLAN. Even if PPPoE can be served by a default VLAN, what happens when if multiple PPPoE clients require different VLANs? There's no way for a CMC to meet such requirements. Thus, a different approach to assigning VLANs using a CMC or a CMTS is sought.

SUMMARY

This summary is provided to introduce a selection of concepts in a simplified form as a prelude to the more detailed description that is presented later. The summary is not intended to identify key or essential features, nor is it intended to delineate the scope of the claimed subject matter.

According to an aspect of the disclosure, a method to assign a service flow classification for a client device is performed at a network interface device. The method includes accessing a configuration file having an interface mask, and correlating interface mask bit values with ports of the network interface device. The network interface device associates the client device with one of the ports, and assigns a service flow classification based on the interface mask bit values for an access request received by the network interface device from the client device. The network interface device then communicates with a virtual local area network mapping device using the service flow classification.

According to an aspect of the disclosure, the configuration file has an interface mask containing a plurality of bit values corresponding to local area network ports within a cable modem or gateway. In one embodiment, the interface mask is a cable modem interface mask. The cable modem interface mask is used to associate a client device or a virtual internal host of the network interface device with at least one of a plurality of local area network ports of the network interface device. The client device is connected to an external local area network port and the virtual internal host is a logical virtual interface embedded within a cable modem or gateway. The network interface device communicates with a virtual local area network mapping device which is one of a cable media converter or a cable modem termination system. The communication uses an RF cable interface of the network interface device to the virtual local area network mapping device, wherein the virtual local area network mapping device maps the assigned service flow classification into a virtual local area network for the client device. The RF cable interface of the network interface device is a DOCSIS interface of a cable modem or gateway. The virtual local area network mapping device is a cable media converter or a cable modem termination system and the client device is one of a laptop or a personal computer.

In another aspect of the disclosure, a cable media converter or cable modem termination system assigns the service flow of the client device to a specific virtual local area network, wherein the client device or an internal host instance of a cable modem or gateway communicates with a head-end network using the specific assigned virtual local area network. To assign the service flow of the client device to a specific virtual local area network, an administrator mapping is applied for a service flow of the cable modem or gateway to a specific virtual local area network according to a policy. The client device is one of a laptop or a personal computer.

In another aspect of the disclosure an apparatus description of the network interface device is provided. The apparatus functions to assign a service flow classification for a client device. The apparatus includes a local area network port connected to a client device, at least one storage device storing a configuration file having an interface mask, and a processor (508) connected to the storage device that accesses the interface mask and correlates an interface mask bit value with the local area network port. The processor associates the client device with the local area network port and assigns a service flow classification based on the interface mask bit value for an access request received by the apparatus from the client device. A transmitter/receiver of the apparatus communicates with a virtual local area network mapping device using the service flow classification.

According to other aspects of the disclosure, the storage device stores a configuration file having an interface mask containing a plurality of bit values corresponding to local area network ports within a cable modem or gateway. The interface mask is a cable modem interface mask. The processor associates the client device or a virtual internal host of the apparatus with at least one of a plurality of local area network ports of the apparatus. The client device is connected to an external local area network port and the virtual internal host is a logical virtual interface embedded within a cable modem or gateway. The transmitter/receiver communicates with one of a cable media converter or a cable modem termination system.

The transmitter/receiver of the apparatus communicates using an RF cable interface of the apparatus to the virtual local area network mapping device, wherein the virtual local area network mapping device maps the assigned service flow classification into a virtual local area network for the client device. The RF cable interface of the apparatus is a DOCSIS interface of a cable modem or gateway. The virtual local area network mapping device is a cable media converter or a cable modem termination system and the client device is one of a laptop or a personal computer.

In other aspects of the disclosure, a cable media converter or cable modem termination system receives the service flow of the client device and assigns the service flow of the client device to a specific virtual local area network, wherein the client device of a cable modem or gateway then communicates with a head-end network using the specific assigned virtual local area network. The cable media converter or cable modem termination system assigns the service flow of the client cable modem or gateway to a specific virtual local area network by applying an administrator mapping for a service flow to a specific virtual local area network according to a policy.

The disclosure also includes a computer program product having instructions which, when the program is executed by a computer, cause the computer to carry out the method described herein. A non-transitory computer readable medium containing software is also included herein having instructions which when executed by a processor cause the processor to implement the method described herein.

Additional features and advantages will be made apparent from the following detailed description of illustrative embodiments which proceeds with reference to the accompanying figures. The drawings are for purposes of illustrating the concepts of the disclosure and is not necessarily the only possible configuration for illustrating the disclosure. Features of the various drawings may be combined unless otherwise stated.

BRIEF DESCRIPTION OF THE DRAWINGS

The foregoing summary, as well as the following detailed description of illustrative embodiments, is better understood when read in conjunction with the accompanying drawings, which are included by way of example, and not by way of limitation with regard to the present principles. In the drawings, like numbers represent similar elements.

FIG. 6 is a service flow classification encoding example;

FIG. 9 is a dynamic host configuration protocol (DHCP) classification encoding example; and FIG. 10 is an example portion of a cable modem configuration file.

DETAILED DISCUSSION OF THE EMBODIMENTS

In the disclosure to follow, a cable modem interface mask (CMIM) based service flow classification mechanism is taught to facilitate VLAN mapping in CMTS/CMC to address one or more of the drawbacks described as above. In this disclosed approach, all cable modems or gateways can share the same configuration data as long as they have the same service subscription. Throughout this disclosure, configuration data may have the embodiment of a configuration file. This sharing of configuration data can reduce an operator's operational load. Any packets from specific IP devices, such as client devices behind cable modems or gateways, can be classified into specific service flows constantly and so QoS in the coaxial cable can be guaranteed, including DHCP/ARP or PPPoE connection packets. The present novel configuration and technique for VLAN mapping does not need to rely on DHCP relay functions. As such, other IP acquisition technologies, such as with PPPoE and multiple PPPoE clients, can be served. Operators can assign VLANs to each IP device at its' discretion.

In the following description of various illustrative embodiments, reference is made to the accompanying drawings, which form a part thereof, and in which is shown, by way of illustration, how various embodiments may be practiced. It is to be understood that other embodiments may be utilized and structural and functional modification may be made without departing from the scope of the present principles.

Figure 1A:
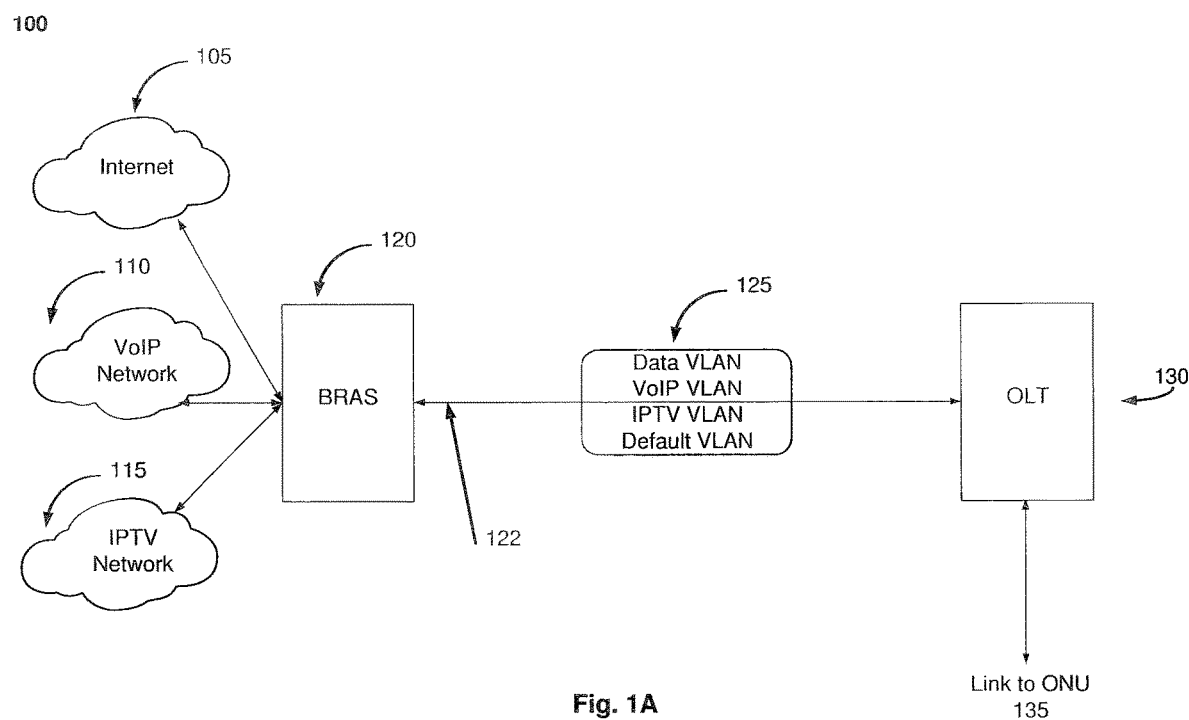
FIG. 1A is a depiction of a head end environment in which aspects of the disclosure may operate.
Figure 1B:
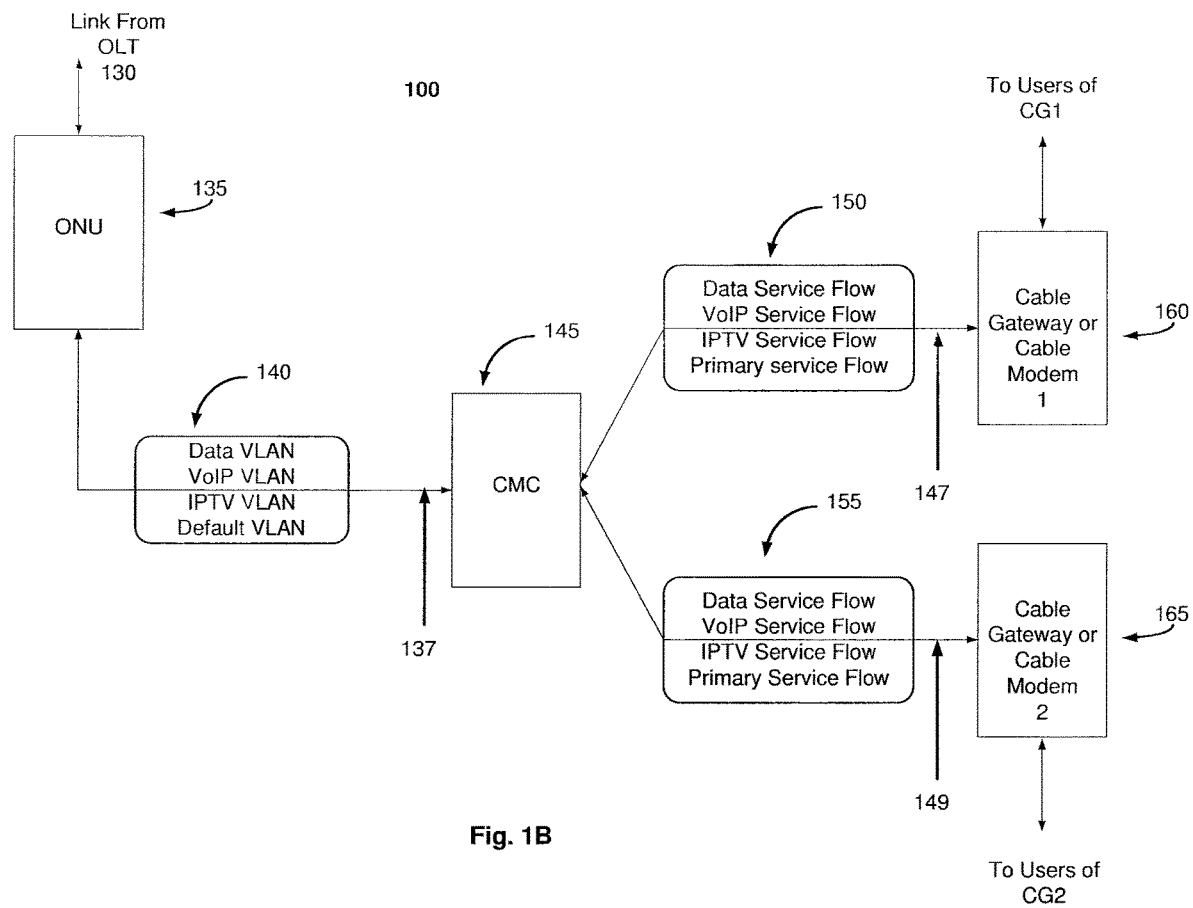
FIG. 1B is a depiction of a destination end environment in which aspects of the disclosure may operate.

FIGS. 1A and 1B depict a system 100 for the VLAN assignment along the DOCSIS network path using a VLAN mapping device, such as a CMC, for layer 2 forwarding mode. FIG. 1A is the headend VLAN assignment path and FIG. 1B is the destination end VLAN assignment path. Different VLANs are assigned to each client device behind cable modems or gateways. FIG. 1A depicts three services Internet 105, VoIP 110 and IP TV 115. A broadband remote access server (BRAS) 120, also referred to as a Broadband Network Gateway (BNG), is a headend device that distributes the services to users downstream. The BRAS 120 is connected to an optical line terminal (OLT) 130 for optical line distribution of headend communications to downstream users. Box 125 of FIG. 1A depicts traffic on the communication line 122 between the BRAS 120 and the OLT 130.

FIG. 1B depicts equipment at the distribution end of the system 100 of FIG. 1A. The optical network unit (ONU) 135 receives an optical signal from the OLT 130 of FIG. 1A. The ONU 135 is also called an optical network terminal (ONT). The ONU 135 receives and distributes communications to a VLAN Mapping device 145 via communication line 137. In this disclosure, the VLAN mapping device 145 will henceforth be referred to as a CMC 145. One of skill in the art will recognize that the VLAN mapping device 145 can be referred to with other nomenclature, but is generally defined as having a VLAN mapping function for multiple gateways or cable modems. A CMTS may also suffice for the VLAN mapping device in architectures that utilize a CMTS.

The box 140 of FIG. 1B depicts VLAN based traffic on the communication line 137 between the ONU 135 and the CMC 145. The CMC 145 communicates with gateway 1 (or cable modem 1) 160 and gateway 2 (or cable modem 2) 165. Even if referred to hereinbelow as a cable modem, items 160 or 165 may be either a cable modem or a gateway. Cable modems or gateway devices 160 and 165 are also referred to herein as network interface devices. Each cable modem or gateway communicates with their respective users. Box 150 of FIG. 1B depicts traffic on the communication line 147 between the CMC 145 and the cable modem or gateway 160. Box 155 of FIG. 1B depicts traffic on the communication line 149 between the CMC 145 and the cable modem or gateway 165. Traffic lines 147 and 149 may be RF cable communication lines per a DOCSIS standard.

Figure 4:
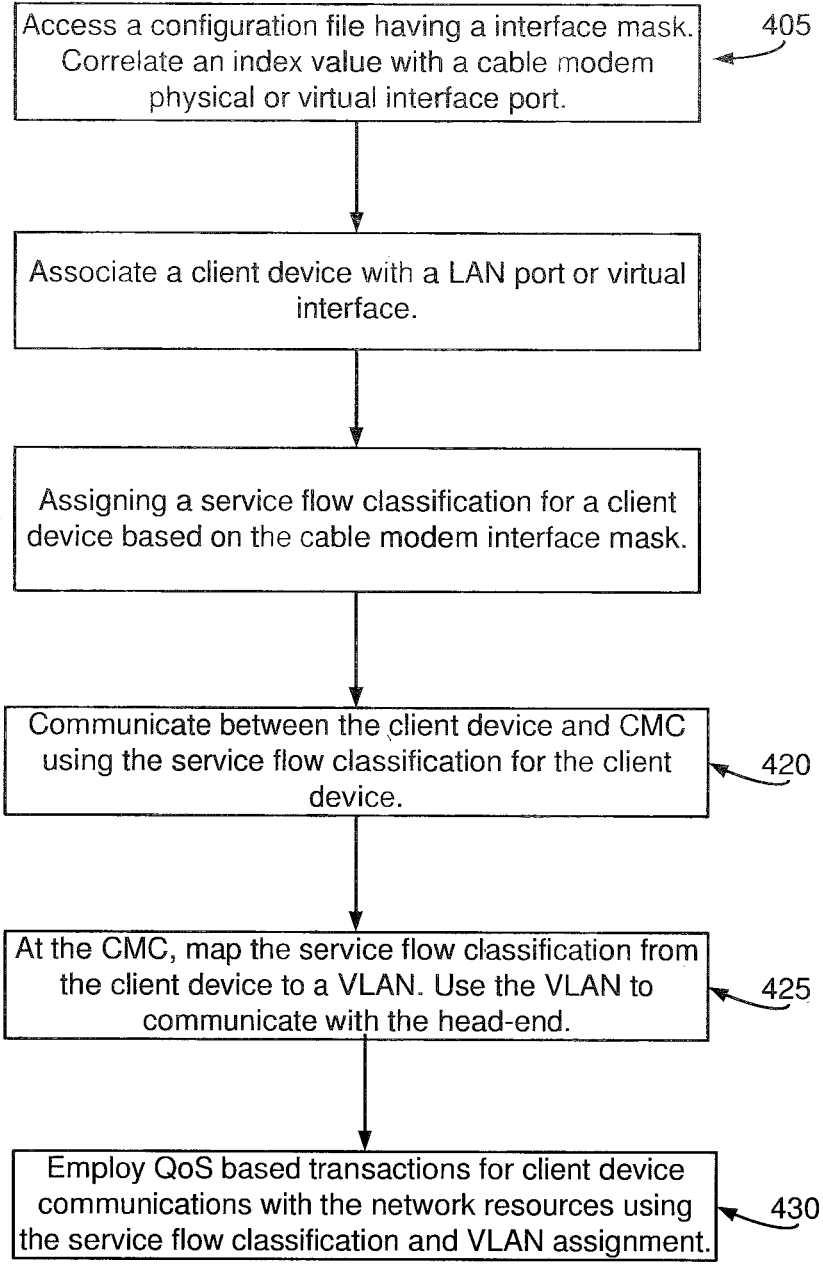
FIG. 4 depicts a flow diagram of a method according to an aspect of the disclosure.

As shown in FIG. 1B, 4 different service flow requests are generated from both cable modem or gateways 160 and 165. Each cable modem or gateway 160, 165 has a Data Service Flow, a voice over internet protocol (VoIP) service flow, an internet protocol television (IPTV) service flow and a primary service flow as shown in traffic boxes 150 and 155 respectively. As shown in traffic box 140, the four service flows from cable modem or gateway 160 are mapped to Data VLAN, VoIP VLAN, IPTV VLAN and Default VLAN respectively, while the 4 service flows from cable modem or gateway 165 are mapped to respectively VLANs in the CMC 145. The VLAN tagged ethernet frames are then forwarded to the ONU 135. The ONU 135 transmits the VLAN mapped frames to the OLT 130.

Figure 2:
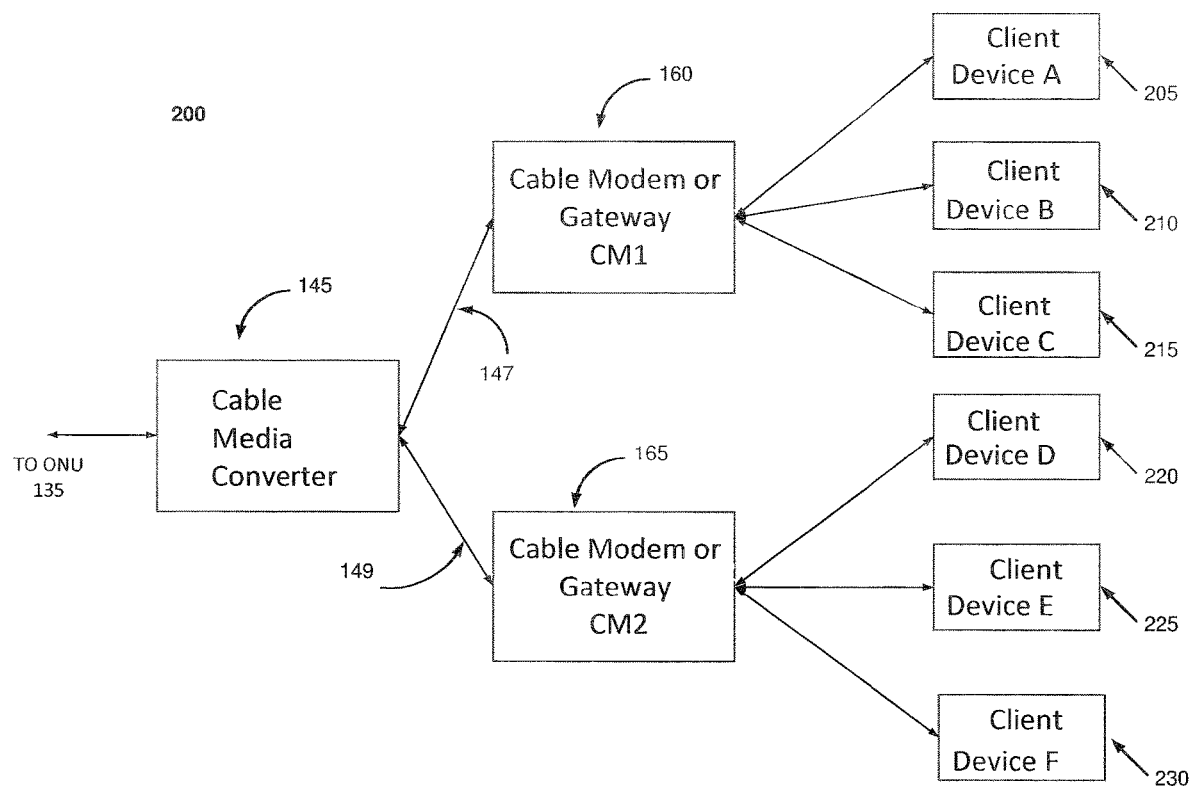
FIG. 2 is a further depiction of a destination end environment in which aspects of the disclosure may operate.

FIG. 2 is an extension of FIG. 1B showing the cable media converter (CMC) 145 connected to gateway or cable modem 160 and gateway or cable modem 165. Each cable modem is shown with three client devices. Cable modem or gateway 160 has client devices A, B, and C, 205, 210, and 215 respectively. Cable modem or gateway or cable modem 165 has a different set of client devices. They are client devices D, E, and F, 220, 225, and 230 respectively.

According to FIGS.-1A and 1B, it is clear if the packets from each IP device, such as a client device, behind a cable modem or gateway are correctly and completely classified to each unique service flow, then it becomes straightforward for a CMC to perform service flow to VLAN mapping to forward groups of packets sharing the common characteristics to the same VLAN. However, mapping relies on the correctly behaved service flow classification occurring on the cable modem. In this disclosure, a CMC is used to assign VLAN membership for each IP device, such as a client device, according to a mapping relationship between each service flow and VLAN, an upstream service flow classification method based on CMIM is proposed to assist such mapping.

According to the C-DOCSIS specification concerning the CMC functionality, a CMC is layer 2 device to bridge between a DOCSIS RF interface towards a cable modem and VLAN aware ethernet interface towards core network. In a layer 2 VLAN switch/bridge environment, each IP device, such as a client device, is located in a specific VLAN and all traffic from and to this IP device must be in this VLAN. An IP device can get its IP configuration by PPPoE or DHCP or a static configuration. There is no direct communication possible between different VLANs at layer 2 without the help of IP router. So, in a CMC environment, once one IP device is assigned into one VLAN, all packets for the IP device must be in the assigned VLAN no matter what protocol it uses.

A CMC needs to map all packets from one specific IP device behind cable modem to a specific VLAN and keep this association consistent for all further communication. This constraint is met by classifying all packets from the IP device to certain unique service flows in cable modem. All packets from this IP device are conveyed in the unique service flow arriving at a CMC. The CMC can map this service flow to the target VLAN.

The regular service flow classification methods in a cable modem or gateway according to DOCSIS or Euro DOCSIS standards cannot classify all packets from one IP device to one unique service flow. For instance, the DHCP and address resolution protocol (ARP) packets from different IP devices cannot be classified to different service flows by IP packet classification rules or Ethernet LLC packet classification rules.

A cable modem interface mask (CMIM) was introduced in the DOCSIS 3.0 standard to represent interfaces connected with cable modem, the interface can be an external LAN side interface or logical interface embedded within a cable modem. CMIM can be 16 bits or 32 bits long, each bit represents one physical or logic interface. It is mostly used in multicast and L2VPN scenarios and some standard interface indexes (bit position) are assigned in standard. However, CMIM has not been used in a CMC environment and most of the interface index are open to vendor specific implementation. Currently, there is no common agreement reached on how to define those open interface masks and how to use them. And there is no clear specification on how to represent each IP interface if one embedded entity (eSafe) such as an embedded router (eRouter) has multiple IP interfaces connected with an embedded cable modem.

Figure 3:
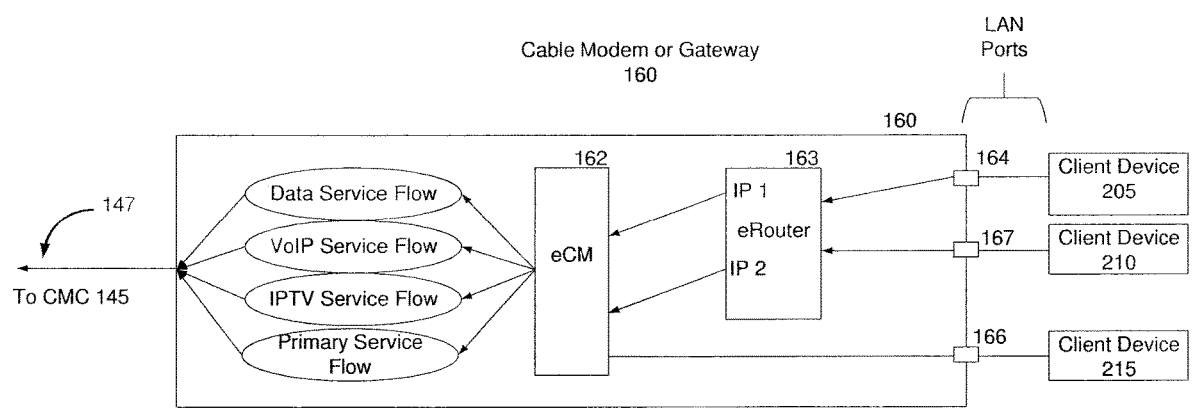
FIG. 3 depicts a flow diagram of a method using device type as a characterization criterion according to an aspect of the disclosure.

According to the DOCSIS standard, a value of CMIM is an encoded bit map with bit position K representing a cable modem (CM) interface index value K. Bit position 0 is the most significant bit of the most significant octet. The following Interface index is defined or reserved:
Bit 0 (0x80): CM's IP stack
Bit 1 (0x40): primary CPE Interface
Bit 2 (0x20): RF interface
Bits 3, 4: reserved
Bits 5 . . . 15 (0x07 FF): Other CPE Ports
Bits 16-31, embedded logical interfaces. Currently defined interfaces include:
Bit 16 (0x00 00 80): PacketCable-eMTA
Bit 17 (0x00 00 40): eSTB-IP
Bit 18 (0x00 00 20): reserved
Bits 19 . . . 31 (0x00 00 1F FF): Other eSAFE interfaces In this disclosure, an IP interface is an interface attached to a cable modem function, either in a cable modem or gateway, and could be physical or logical as illustrated in FIG. 3. One IP device, such as a client device, can have one or multiple IP interfaces, each IP interface has the corresponding CMIM value. According to the CMIM definition, 0x07FF is used to represent any external physical interface and 0x00001FFF for any internal logical interface. The following CMIM values are defined to represent various interfaces of a cable modem or gateway using aspects of the disclosure.

| Bit Position | CMIM index | Interface of cable modem |
|---|---|---|
| 5 | 0x0400 0000 | Ethernet LAN port 1 |
| 6 | 0x0200 0000 | Ethernet LAN port 2 |
| 7 | 0x0100 0000 | Ethernet LAN port 3 |
| 8 | 0x0080 0000 | Ethernet LAN port 4 |
| 9 | 0x0040 0000 | Wifi primary SSID |
| 10 | 0x0020 0000 | Wifi second SSID |
| 11 | 0x0010 0000 | Wifi third SSID |
| 19 | 0x0000 1000 | WAN IP interface of eRouter for service type 1 |
| 20 | 0x0000 0800 | WAN IP interface of eRouter for service type 2 |
| 21 | 0x0000 0400 | WAN IP interface of eRouter for service type 3 |

FIG. 3 depicts a cable modem or gateway 160 example having RF cable interface 147 to CMC 145, where cable modem functions are within the gateway 160. Such a cable modem or gateway implementation may have external IP devices, such as client devices 205, 210, and 215, connected with physical LAN ports, such as port 166, and multiple logical IP device connections from embedded eRouter 163, such as IP1, IP2 of 163. Although cable modem or gateway 160 is depicted, the disclosed principles apply to a plurality of cable modems or gateways, such as both 160 and 165, as shown in FIG. 2. All these IP interfaces are seen in the embedded cable modem (eCM) 162 as unique IP devices respectively. The interfaces are CMIM indexed (interface mask indexed) as part of a configuration file loaded into an embedded cable modem 162. As is seen by the example of FIG. 3, a client device 205 usually has one LAN port interface. The interfaces are then identified from the point of view of cable modem as explained in the following table.

| Interface | CMIM | Service Type |
|---|---|---|
| LAN interface 4 | 0x0080 0000 | IPTV |
| eRouter WAN IP interafce 1 | 0x0000 1000 | VoIP |
| eRouter WAN IP interface 2 | 0x0000 0800 | Internet |

An example portion of the cable modem configuration file for such classification is provided in FIG. 10 which presents a CMIM based classification that takes place inside the cable modem or gateway.

The cable modem 160 or 165 is provisioned with a cable modem configuration file. This provisioning can be accomplished using a provisioning server (not shown) to store the cable modem configuration file in the storage of the cable modem. The cable modem configuration file can then be accessed for use. The cable modem configuration file, referred to herein simply as a configuration file, can classify all packets from each IP device to a corresponding service flow by the means of a CMIM index, referred to herein as an index mask that is part of the configuration file. The configuration file may be loaded and stored in a cable modem or an embedded cable modem, such as in FIG. 3 item 162 for later access by the cable modem. Each IP device, such as client devices 205, 210, and 215, behind the cable modem 160 has a unique service flow to convey all packets from it to the CMC 145. And all cable modems (both 160 and 165, and others) can share the same configuration file as long as they have the same service subscription level. And along with the service flow classification in cable modem configuration file, there are QoS parameters associated with each service flow that can be defined. Accordingly, a QoS guarantee can be maintained for each different service flow or IP device. Thus, for instance, for client devices 205, 210, and 215, each having a LAN port interface to the cable modem, may have different QoS transactions when mapped as separate service flows by the cable modem.

It is noted that, at the cable modem, any client device or internal host instance which is associated with specific CMIM inherently is classified into its specific service flow, Thus, each client device or internal host instance of cable modem is communicating with CMC or CMTS in its specific service flow. After VLAN assignment by the CMC or CMTS, no matter what communication traffic is, the VLAN assignment is persistent for all packets originating from the same client device.

With a CMIM in place at the cable modem or gateway, then, on the CMC or CMTS side, the system administrator can now easily decide the VLAN assignment policy at his/her discretion. The VLAN assignment policy is very flexible; the administrator can choose the same VLAN for same service type or different VLAN for more security or performance concerns. The VLAN assignment is free to change without any modification burden on cable modem or gateway side. That is, the configuration file of the cable modems or gateways is not subject to change because of VLAN re-mapping in the CMC or CMTS. The configuration file in each cable modem or gateway is independent of the VLAN assignments in the CMC or CMTS. The following table is an example for VLAN assignment.

| CM | Service Flow | VLAN |
|---|---|---|
| cm1 | IPTV | Vlan100 |
| cm1 | VoIP | Vlan200 |
| cm1 | Internet | Vlan1000 |
| cm2 | IPTV | Vlan100 |
| cm2 | VoIP | Vlan200 |
| cm2 | Internet | Vlan1001 |

In addition, due to the CMC being a layer 2 device performing bridging or switching, it maintains a MAC address learning table as illustrated in following table when it forwards the upstream packets to correct VLAN.

| VLAN | MAC Address | CM | Service Flow |
|---|---|---|---|
| Vlan100 | aa:aa:aa:aa:aa:aa | cm1 | IPTV |
| Vlan200 | bb:bb:bb:bb:bb:bb | cm2 | VoIP |

Due to the symmetry nature of layer 2 VLAN forwarding, the downstream return packets will be in the same upstream VLAN, when the CMC receives downstream packets, it can determine the correct return path towards the cable modem with an associated service flow treatment by looking up in the MAC address learning table.

FIG. 4 depicts an example flow diagram 400 of using an interface mask in configuration file for a cable modem, such as a CMIM, to classify transactions from a client device connected to a cable modem into service flows. The service flows can then be used to identify VLANs to establish communication with a head-end to obtain improved quality of service for client devices. At step 405, a configuration file, such as a cable modem configuration file, is accessed by the cable modem. The configuration file has an interface mask, such as a CMIM, having bit positions that represent physical or virtual ports, such as local area network ports, of a cable modem. At a cable modem, interface mask index values (bit position values) are correlated with each interface connected with the cable modem, the interface can be an external LAN side interface or logic virtual interface embedded within cable modem. Once configured and installed, the configuration file having the interface mask need not be changed and can be accessed as needed to classify client device transactions with service flows.

At step 410, an association is made, at the cable modem, between an external client device (home client device), such as a personal computer, laptop, and the like or WiFi connected device, and a port of the cable modem. The port can be either an external LAN side interface or logic virtual interface embedded within cable modem that has a corresponding index value in the interface mask. This has the action of associating the home client device or virtual internal host instance with a specific physical LAN interface or internal embedded interface according to which cable modem interface they are attached.

At step 415, the cable modem assigns (generates) a service flow classification for a client device based on the cable modem interface mask and the association that a client device has with the interface mask values. Thus, at the cable modem, using the configuration file, which can be provided by a provisioning server, the cable modem is instructed to make a service flow classification for a client device based on the interface mask within the configuration file. Thus, by using the interface mask and association of client devices to the interface mask, client device transactions with the cable modem are classified to a service flow. As explained above, this classification is useful by the VLAN mapping device, such as a CMC, to assign a VLAN to the service flow for the client device.

At the cable modem, any client device or internal host instance which is associated with specific interface mask, such as a CMIM, is inherently classified into its specific service flow. So, at step 420, each client device or internal host instance of the supporting cable modem is able to communicate with the VLAN mapping device, such as the CMC, using the client device's specific service flow.

At step 425, in a VLAN mapping device, such as a cable media converter (CMC), a mapping of each service flow of each cable modem to a specific Virtual LAN (VLAN) according to its own policy is made. Generally, an administrator of the CMC is able to designate the VLAN mapping rule to utilize the service flow classification generated for a client device to assign a VLAN for the service flow from the cable modem. Accordingly, at step 430, a client device or internal host instance of a cable modem is then able to communicate within its assigned VLAN to a head end to access network resources. No matter what the communication traffic is, the VLAN is persistent for all packets originating from the same client device. Note that any one client device may have more than one service flow and thus possibly more than one VLAN and corresponding QoS. Thus, per the service flow classification and VLAN assignment, QoS based transactions can be experienced for the client device communications with the network resources. These client device QoS communications are enabled by the service flow classification provided by the cable modem. Accordingly, the presently discussed novel method of FIG. 4 provides an enhanced performance for the client devices connected to the cable modem. Accordingly, method 400 represents an improvement in performance and capability over the prior art for cable modems and the client devices that they support.

Figure 5:
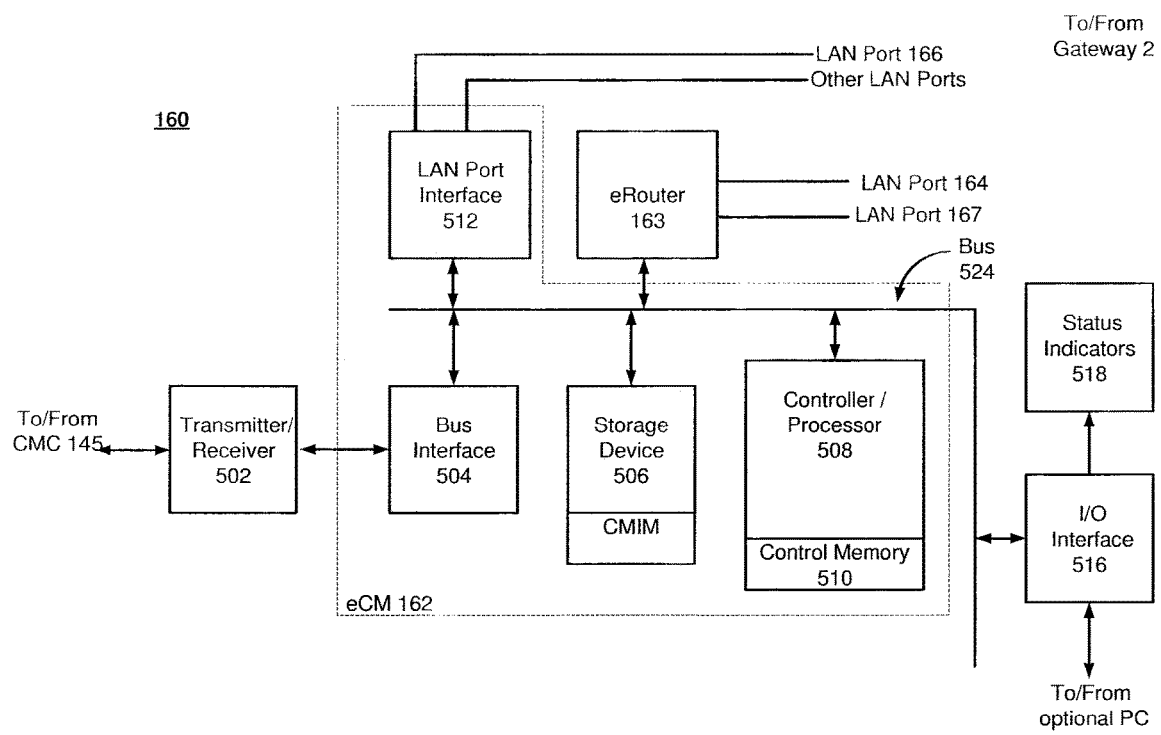
FIG. 5 is a block diagram of an apparatus that can execute the method of FIG. 4.

FIG. 5 is an example embodiment of an apparatus, such as a cable modem or gateway, to perform the techniques of FIG. 4. The apparatus of FIG. 5 can be either a special-purpose machine, or part of a larger machine that performs other tasks. Thus, the FIG. 5 apparatus can be either a cable modem or a gateway or the like as is well understood by those of skill in the art. As a reference for the description to follow, the apparatus will be referred to as a cable modem, such as the device in FIGS. 2 and 3 item 160.

The cable modem 160 of FIG. 5 includes a transmitter/receiver interface 502 providing connectivity to a network interface device that performs VLAN mapping, such as the CMC 145 of FIG. 2. The interface 502 connects to the bus interface 504 which allows access to the internal bus 524. Other non-bus implementations are also possible as is well known to those of skill in the art. Present on bus 524 are a storage device 506 which can be used for any general storage such as retrieved or requested data and network management data, parameters, and programs. Storage device 506 may also serve as storage for a configuration file having a cable modem interface mask (CMIM) as described previously. Storage device 506 may also serve as disk or solid-state storage of the device/appliance profile information. Main program or utility and other programs are under the control of controller/processor 508.

This controller/processor 508 may be a single processor or a multiplicity of processors performing the tasks of data acquisition, user interface control, and resource management. Controller/processor 508 can perform the methods described in FIG. 4. Control memory 510 can supply program instruction and configuration control for controller/ processor 508. In one embodiment, the configuration file having the cable modem interface mask (CMIM) may be stored in control memory 510 in conjunction with or as an alternative to storage 506. The status indicators are a user interface 518 and allows a user, system owner, or system manager to see a status of the apparatus 160. Such indicators may include a display, LEDs, printer interface, or data logging interface. An input/output (I/O) interface 516 allows the cable modem 160 to connect to a personal computer or other device that can be used to configure and control the cable modem functionality. Such functionality can include programming, execution, control, and monitoring of cable modem functions and features. The I/O interface 516 may be a hardline interface, such as an Ethernet interface or may operationally be substituted with an RF interface so that the cable modem 160 can communicate with a PC via a protocol driven interface, such as IEEE 802.11. Other interfaces that are possible via I/O interface 516 are an interactive interface which may include the use of a display device, keyboard, mouse, light pen, and the like.

Cable modem apparatus 160 has a local area network (LAN) port interface 512 which allows LAN port access to and from external client devices such as shown in FIG. 3. As can be appreciated by one of skill in the art, the LAN port interface 512, the bus interface 504, the storage device 506, and the controller/processor 508 can be considered an embedded cable modem. This is one embodiment, similar to the embodiment shown in FIG. 3. However, even without the embedded cable modem classification embodiment of components, the configuration of FIG. 5 remains as one embodiment for a cable modem or gateway that have the features of the disclosure innovation.

The LAN Port interface 512 serves to connect the cable modem 160 to external devices with an interface, such as an ethernet interface, to LAN ports 166 and the like. An embedded router 163 serves to direct traffic to multiple LAN ports such as ports 164 and 167. According to aspects of the disclosure, each of the LAN ports of the cable modem 160 may be assigned or characterized with a service flow commensurate with a cable modem interface mask (CMIM) by the controller/processor 508.

The controller/processor 508 of the cable modem 160 of FIG. 5 is configured to provide processing services for the steps of the method of FIG. 4. For example, the controller processor can provide instruction control to monitor and control the network interface 502, the I/O interface 516 and 518 status indicators and display, the LAN port interface 512, and the router 163. The controller/processor 508 is able to access the CMIM of the cable modem configuration file stored in either storage device 506 or control memory 510 to perform the service flow classification. As transactions from the client devices connected to the LAN ports are characterized by a service flow according to the CMIM, then the transmitter/receiver 502 is able to pass the classification and transaction onto the VLAN mapping device 145 in order to have the transaction assigned a VLAN address to establish a Quality of Service (QoS) for the transaction. Controller processor 508 controls the interfaces to conduct the innovative operations.

In addition to the service flow classification described hereinabove, additional new service flow classification rules are presented hereinbelow that are not defined in DOCSIS or EuroDOCSIS standards. These are presented so that address resolution protocol (ARP) messages from different internet protocol (IP) subnet or targeting for different IP subnet can be classified into different service flows as well as the dynamic host configuration protocol (DHCP) packets in terms of different presence status or different value of certain DHCP option.

DOCSIS or EuroDOCSIS standards specify a mechanism for each vendor to define their own classification rules. Proposed hereinbelow are extra service flow classification rules under the vendor-specific extension framework that maintain interoperability as much as possible, and to do further classification among ARP packets and DHCP packets according to their protocol dependent payload contents beyond regular TCP/IP/LLC header information.

Configuration items in cable modem configuration file are organized as list of type-length-value (TLV) encodings, TLV stands for triple combination consisting of Type filed, Length field and Value field. Both Type and Length filed is of 1 byte length by themselves. The value field has varying length depending on the contents and can be populated with another sub-TLV or list of sub-TLV encodings. This hierarchical encapsulation can continue as long as the value filed does not exceed length limitation. The whole configuration file is eventually a tree like layout as illustrated in FIG. 6.

FIG. 6 is a service flow classification encoding example. The vendor-specific service flow classification rule uses the sub-TLV type code 43 under Upstream Packet Classification code 22 or Downstream Packet Classification code 23 or Upstream Drop Packet Classification code 60. And the value of this vendor-specific classification is also a combination of various sub-TLV encodings. The first sub-TLV of vendor-specific classification must be vendor identification TLV which has type code 8 and length 3 bytes, the value field contains the vendor identification specified by the three-byte vendor-specific organization unique identifier (OUI). This vendor identification may be provided as 0x001095, i.e. owned by Technicolor, however any OUI can be used as appropriate.

The hereinbelow proposed classification rules consist of multiple new classification TLV encodings under the vendor-specific encoding 43 which is in turn under the top level TLV code 22, 23 or 60. The following table summarizes the sub-TLV encoding under TLV 43 under TLV 22/23/60 and its brief description for this vendor-specific classification operation, all multi-octet values are in network-byte order, which means the octet containing the most-significant bits is the first transmitted on the wire.

| Sub TLV encoding | type code | length | Value description |
|---|---|---|---|
| Sender IP in ARP packet | 111 | 4 | 4 bytes IP address representation for sender IP address in ARP packet |
| netmask for Sender IP in ARP packet | 112 | 4 | General IP subnet netmask notation |
| Target IP in ARP packet | 113 | 4 | 4 bytes IP address representation for target IP address in ARP packet |
| netmask for Target IP in ARP packet | 114 | 4 | General IP subnet netmask notation |
| DHCP option code | 115 | 1 | The code number of the target DHCP option |
| DHCP option value | 116 | varying | The value of the target DHCP option |
| DHCP option matching action | 117 | 1 | 0x00: option present 0x01: option NOT present 0x02: sub-string 0x03: prefix 0x04: suffix |

-continued

| Sub TLV encoding | type code | length | Value description |
|---|---|---|---|
| | | | 0x05: exact match |
| | | | Others: reserved |
| DHCP option 60 value | 118 | varying | The value of DHCP option 60 |
| DHCP option 77 value | 119 | varying | The value of DHCP option 77 |
| DHCP option 124 value | 120 | varying | The value of DHCP option 124 |

There can be multiple classification rules proposed in this invention existing in cable modem configuration file under same or different TLV 43. The relationship between classification rules under the same TLV 43 is logical AND which mean all classification rules must be met. Under one TLV 43 definition, the sub-TLV 111, 112, 113, 114 which are for ARP classification can't coexist with sub-TLV 115 to 120 which are for DHCP packet classification.

The ARP protocol is designed to resolve layer 3 IP address to its corresponding layer 2 ethernet MAC address. In ARP packet, there is 4 bytes field indicating the sender IP address and 4 bytes field indicating the target IP address which is supposed to be resolved. The sub-TLV 111, 112, 113 and 114 are specific for ARP packets classification.

Sub-TLV 111 defines the sender IP address in ARP packet to be verified. It has fixed length of 4 bytes as IPv4 address notation. The value of the field specifies the matching value for the IP address. An ARP packet with sender IP address "sender-ip" matches this parameter if (sender-ip AND netmask)=(TLV-111 AND netmask), where "netmask" is the parameter defined in sub-TLV 112. If this parameter is omitted, then comparison of the sender IP for ARP packet is not required.

Sub-TLV 112 defines the netmask to be used for sender IP address comparison for ARP packet. The value of the field specifies the mask value for the IP address. If this parameter is omitted, then the default netmask is 255.255.255.255.

Sub-TLV 113 defines the target IP address in ARP packet to be verified. The value of the field specifies the matching value for the IP address. An ARP packet with target IP address "target-ip" matches this parameter if (target-ip AND netmask)=(TLV-113 AND netmask), where "netmask" is the parameter defined in sub-TLV 114. If this parameter is omitted, then comparison of the target IP for ARP packet is not required.

Sub-TLV 114 defines the netmask to be used for target IP address comparison for ARP packet. The value of the field specifies the mask value for the IP address. If this parameter is omitted, then the default netmask is 255.255.255.255.

Figure 7:
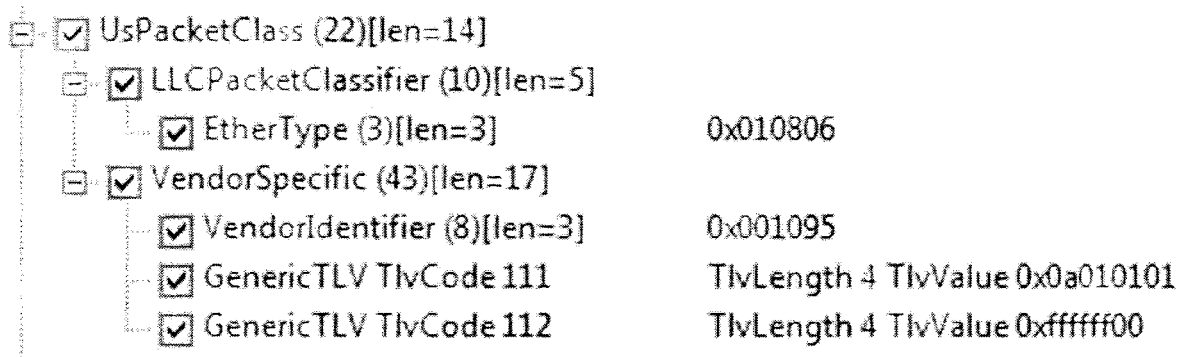
FIG. 7 is a first example of an address resolution protocol (ARP) based classification example.

FIG. 7 is ARP classification encoding example 1. The example shown in FIG. 7 defines an upstream classification rule to match any ARP packets which has send IP address falling into IP subnet 10.1.1.1/255.255.255.0.

Figure 8:
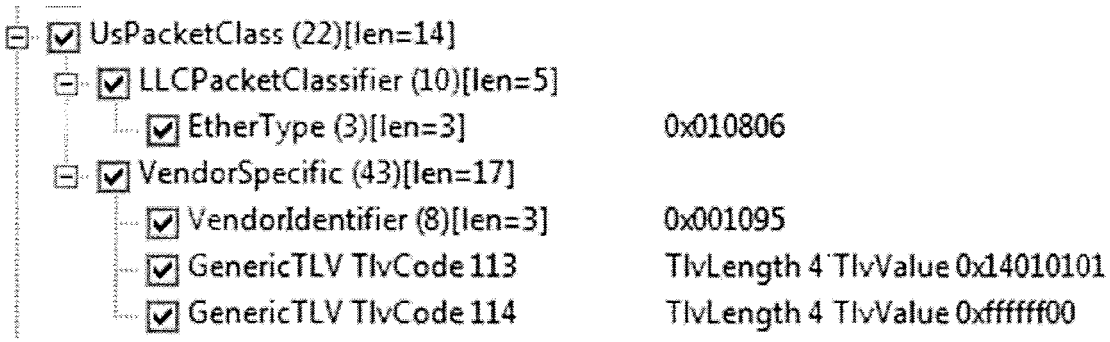
FIG. 8 is a second example of an address resolution protocol (ARP) based classification example.

FIG. 8 is ARP classification encoding example 2. The example shown in FIG. 8 defines an upstream classification rule to match any ARP packets which has target IP address falling into IP subnet 20.1.1.1/255.255.255.0.

DHCP is user datagram protocol (UDP) based protocol for clients to get IP address and other configuration data such as network time protocol (NTP) server or domain name server (DNS) information from a DHCP server. The DHCP server may assign different IP configuration data to clients based on various information conveyed from clients and local administration policy. The information from DHCP clients are mostly carried by various types of DHCP options. DHCP option is also of TLV triple structure consisting of option code, length and value fields.

Sub-TLV 115, 116 and 117 under TLV 43 are defined here for DHCP option comparison for packet classification. Because DHCP option 60, 77 and 124 are widely used for client to identify their vendor class, user class or vendor-identifying vendor class, for simplification reason, we also define sub-TLV 118, 119 and 120 to simplify classification definition for those 3 popular DHCP options.

Sub-TLV 115 defines the DHCP option code to be checked in DHCP packet. Its length matches the length of DHCP option code definition which is 1 byte. The value of this field is the code number of DHCP option. This sub-TLV can't be missing if the classification rule is for DHCP packet classification operation.

Sub-TLV 116 defines the detail value of the DHCP option specified in sub-TLV 115. The length of value is varying and decided by the content of value. The value can be complete or partial of the target DHCP option, it depends on sub-TLV 117. And combined with sub-TLV 117, they define various comparison criteria to verify if DHCP packets match this classification rule or not. Sub-TLV 117 defines the matching action for the DHCP option specified in sub-TLV 115 and 116. Its length is 1 byte and the value of it has designated meaning.

Value 0x00 means to check if the DHCP option specified by sub-TLV 115 is present in the DHCP packet, if it's present, the DHCP packet hits this classification rule. This is also the default value. This value also makes the sub-TLV 116 irrelevant. Value 0x01 is the opposite to value 0x00. It imposes the absence of the specific DHCP option. It also makes sub-TLV 116 irrelevant. Value 0x02 means the as long as the value specified in sub-TLV 116 is sub-string of the DHCP option value in the DHCP packet, the DHCP packet meets this classification. Value 0x03 is the restricted version of value 0x02, in order to match this classification rule, the value specified in sub-TLV 116 must be the prefix of the DHCP option value in the DHCP packet. Value 0x04 is the restricted version of value 0x02 too, in order to match this classification rule, the value specified in sub-TLV 116 must be the suffix of the DHCP option value in the DHCP packet. Value 0x05 defines the exact match action. In order to match this classification rule, the value specified in sub-TLV 116 must be exactly same as the DHCP option value in the DHCP packet. The other values of sub-TLV 117 are reserved.

FIG. 9 is a DHCP classification encoding example. As shown in FIG. 9, the example encoding defines an upstream classification rule to match DHCP request message packets from client to server in which there is DHCP option 60 existing and its value exactly match string 'technicolor'. Sub-TLV 118, 119 and 120 are specified here to simplify common DHCP option matching operation for DHCP option 60, 77, 124 respectively. Each of them can be specified together with sub-TLV 117 to classify DHCP packets by their option value and matching criteria.

The implementations described herein may be implemented in, for example, a method or process, an apparatus, or a combination of hardware and software. Even if only discussed in the context of a single form of implementation (for example, discussed only as a method), the implementation of features discussed may also be implemented in other forms. For example, implementation can be accomplished via a hardware apparatus, hardware and software apparatus. An apparatus may be implemented in, for example, appropriate hardware, software, and firmware. The methods may be implemented in, for example, an apparatus such as, for example, a processor, which refers to any processing device, including, for example, a computer, a microprocessor, an integrated circuit, or a programmable logic device. Any and all of the functional or structural features of the method and apparatus disclosed hereinabove may be combined in a single embodiment. Alternately, the features may also be combined in separate embodiments, each with fewer features in accordance with the description and claims herein.

Additionally, the methods may be implemented by instructions being performed by a processor, and such instructions may be stored on a processor or non-transitory computer-readable media, or a computer program product such as, for example, an integrated circuit, a software carrier or other storage device such as, for example, a hard disk, a compact diskette ("CD" or "DVD"), a random-access memory ("RAM"), a read-only memory ("ROM") or any other magnetic, optical, or solid-state media. The instructions may form an application program tangibly embodied on a non-transitory computer-readable medium such as any of the media listed above or known to those of skill in the art. The instructions thus stored are useful to execute elements of hardware and software to perform the steps of the method described herein.

The invention claimed is:

1. A method performed at a network interface device in a network, the method comprising:
accessing configuration data representative of an interface mask, wherein data values of the interface mask correlate with one or more of external physical interface ports and logical internal interface ports of the network interface device;
associating a client device with one of the one or more of external physical interface ports and logical internal interface ports of the network interface device;
assigning a service flow classification based on the data values of the interface mask for the client device; and
communicating with a virtual local area network mapping device in the network using the service flow classification; wherein the network interface device and the virtual local area network mapping device are different devices in the network.

2. The method of claim 1, wherein accessing the configuration data representative of the interface mask comprises accessing a configuration file having an interface mask containing a plurality of bit values corresponding to one or more local area networks of the one or more of external physical interface ports and logical internal interface ports within a cable modem or gateway.

3. The method of claim 1, wherein the interface mask is a cable modem interface mask.

4. The method of claim 1, wherein associating the client device comprises associating the client device or a virtual internal host with at least one of a plurality of local area network ports of the network interface device.

5. The method of claim 4, wherein the client device is connected to an external local area network port and the virtual internal host is a logical virtual interface embedded within a cable modem or gateway.

6. The method of claim 1, wherein communicating with a virtual local area network mapping device comprises communicating with one of a cable media converter or a cable modem termination system.

7. The method of claim 1, wherein communicating with a virtual local area network mapping device comprises communicating using an RF cable interface of the network interface device to the virtual local area network mapping device, wherein the virtual local area network mapping device maps the assigned service flow classification into a virtual local area network for the client device.

8. The method of claim 7, wherein the RF cable interface of the network interface device is a DOCSIS interface of a cable modem or gateway.

9. The method of claim 1, wherein the virtual local area network mapping device is a cable media converter or a cable modem termination system and the client device is one of a laptop or a personal computer.

10. The method of claim 1, further configured for, in a cable media converter or cable modem termination system, assigning the service flow of the client device to a specific virtual local area network, wherein the client device or an internal host instance of a cable modem or gateway communicates with a head-end network using the specific assigned virtual local area network.

11. The method of claim 10, wherein assigning the service flow of the client device to a specific virtual local area network comprises applying an administrator mapping for a service flow of the cable modem or gateway to a specific virtual local area network according to a policy.

12. A network interface device comprising at least one processor configured to perform:
accessing configuration data representative of an interface mask, wherein data values of the interface mask correlate with one or more of external physical interface ports and logical internal interface ports of the network interface device;
associating a client device with one of the one or more of external physical interface ports and logical internal interface ports of the network interface device;
assigning a service flow classification based on the data values of the interface mask for the client device; and
communicating with a virtual local area network mapping device using the service flow classification, wherein the network interface device and the virtual local area network mapping device are different devices in a network.

13. The network device of claim 12, wherein the network interface device comprises a cable modem or gateway.

14. An apparatus in a network, the apparatus comprising:
a local area network port that connects to a client device;
a storage device that stores a configuration file having an interface mask;
a processor that connects to the storage device that accesses the interface mask which correlates an interface mask bit value with the local area network port;
wherein the processor associates the client device with the local area network port, the processor assigning a service flow classification based on the interface mask bit value for the client device; and
a transmitter/receiver that communicates with a virtual local area network mapping device using the service flow classification;
wherein the local area network port comprises one of an external physical interface port and a logical internal interface port of the apparatus, and wherein the network interface device and the virtual local area network mapping device are different devices in the network.

15. The apparatus of claim 14, wherein the storage device stores a configuration file having an interface mask containing a plurality of bit values corresponding to local area network ports within a cable modem or gateway.

16. The apparatus of claim 15, wherein the interface mask is a cable modem interface mask.

17. The apparatus of claim 14, wherein the processor associates the client device or a virtual internal host of the apparatus with at least one of a plurality of local area network ports of the apparatus.

18. The apparatus of claim 17, wherein the virtual internal host is associated with the logical internal interface port embedded within a cable modem or gateway.

19. The apparatus of claim 14, wherein the transmitter/receiver communicates with one of a cable media converter or a cable modem termination system.

20. The apparatus of claim 14, wherein the transmitter/receiver communicates using an RF cable interface of the apparatus to the virtual local area network mapping device, wherein the virtual local area network mapping device maps the assigned service flow classification into a virtual local area network for the client device.

* * * * *